Figure 1:
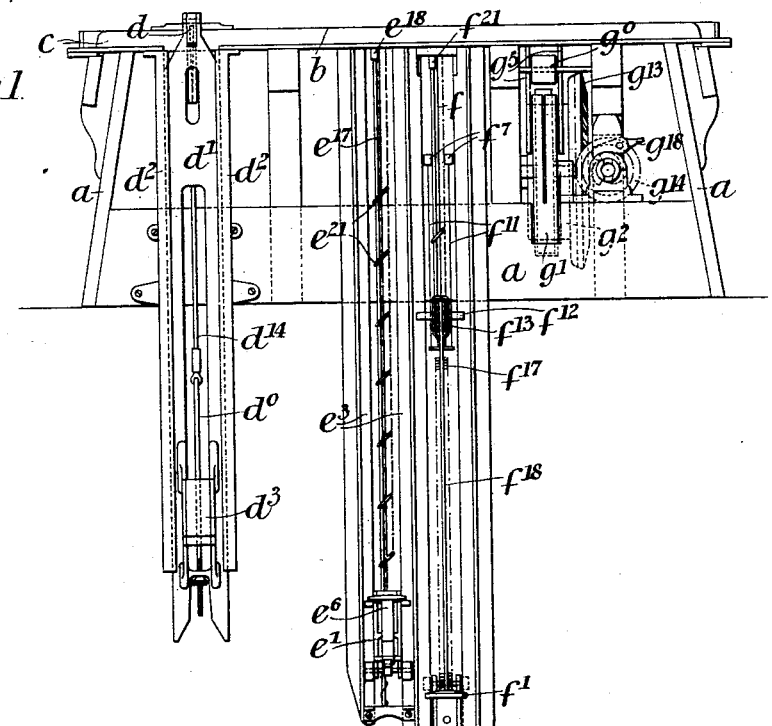

(No Model.) 5 Sheets—Sheet 1.

A. SAUNDERS.
CHEESE CUTTING APPARATUS.

No. 593,496. Patented Nov. 9, 1897.

Witnesses. Inventor.

(No Model.) 5 Sheets—Sheet 2.

A. SAUNDERS.
CHEESE CUTTING APPARATUS.

No. 593,496. Patented Nov. 9, 1897.

Witnesses
Inventor
A. Saunders (No Model.) 5 Sheets—Sheet 3.
A. SAUNDERS.
CHEESE CUTTING APPARATUS.
No. 593,496. Patented Nov. 9, 1897.
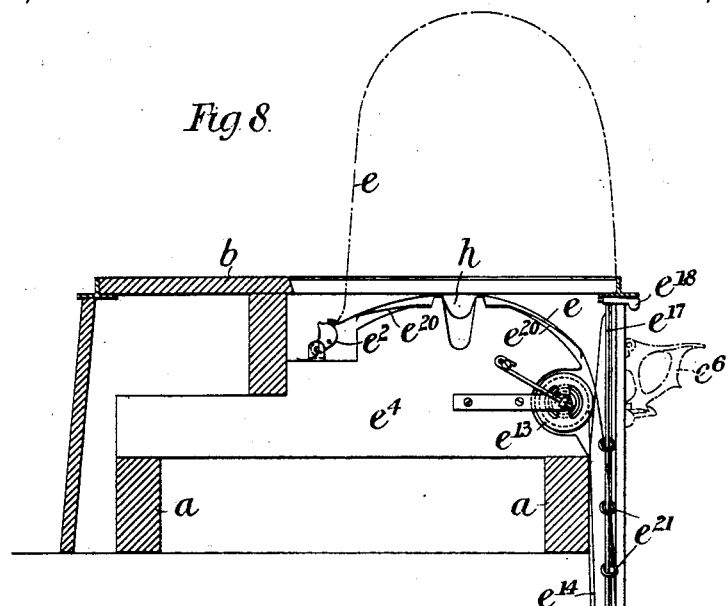
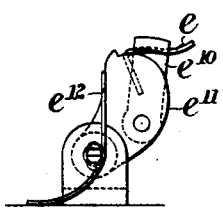
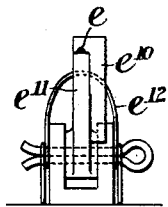
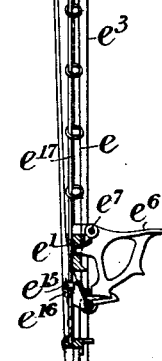
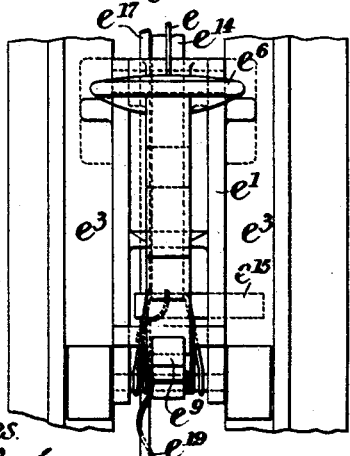
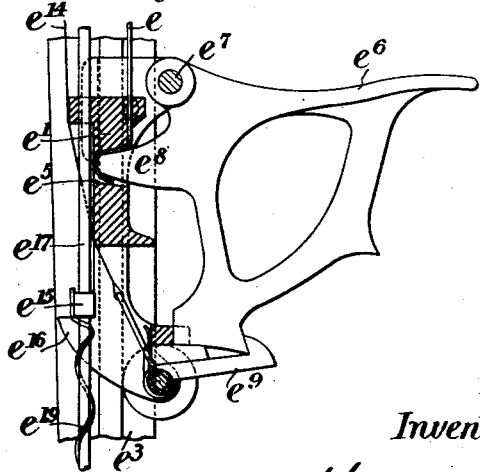
Witnesses. Inventor.

(No Model.) 5 Sheets—Sheet 4.
A. SAUNDERS.
CHEESE CUTTING APPARATUS.
No. 593,496. Patented Nov. 9, 1897.
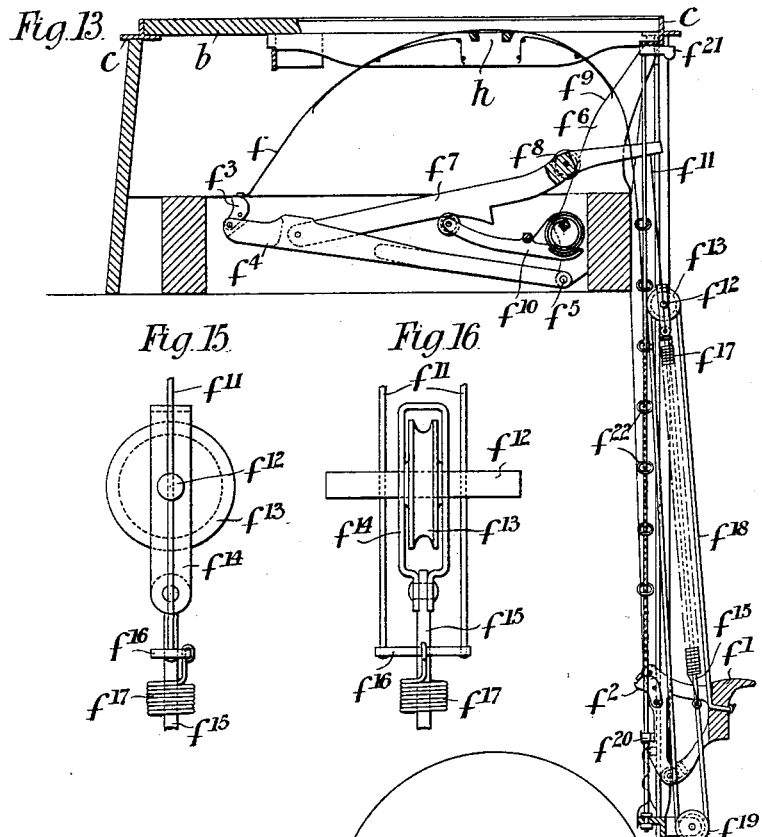
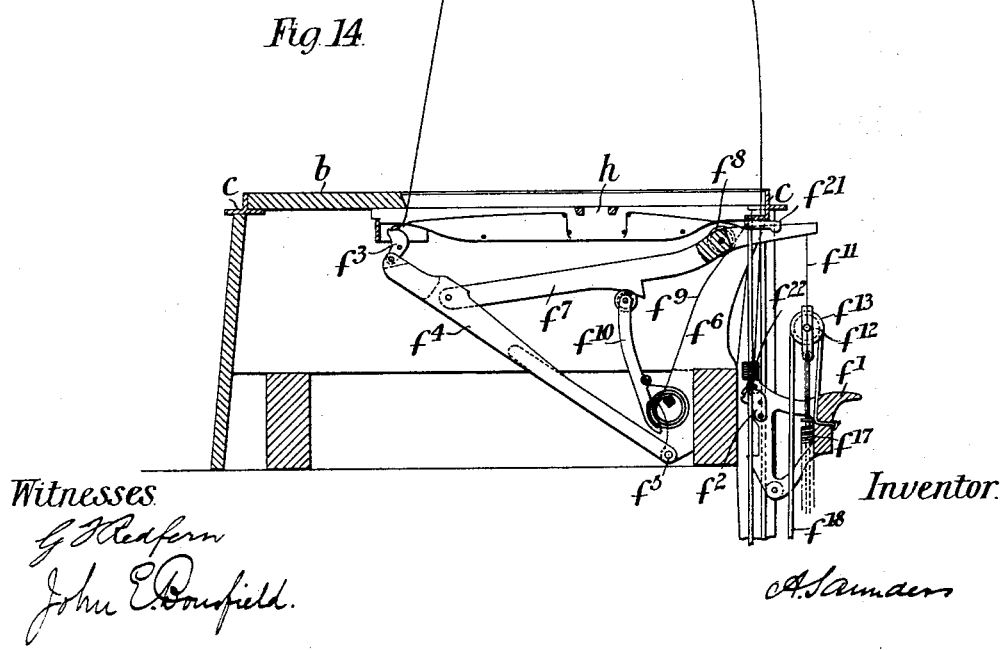
Witnesses
G. H. Redfern
John E. Bousfield.
Inventor
A. Saunders (No Model.) 5 Sheets—Sheet 5.

A. SAUNDERS.
CHEESE CUTTING APPARATUS.

No. 593,496. Patented Nov. 9, 1897.

Witnesses
Inventor

UNITED STATES PATENT OFFICE.

ALFRED SAUNDERS, OF BRIGHTON, ENGLAND.

CHEESE-CUTTING APPARATUS.

SPECIFICATION forming part of Letters Patent No. 593,496, dated November 9, 1897.

Application filed April 2, 1897. Serial No. 630,410. (No model.)

*To all whom it may concern:*

Be it known that I, ALFRED SAUNDERS, a subject of the Queen of Great Britain, residing at Brighton, England, have invented new and useful Improvements in Cheese-Cutting Apparatus, of which the following is a specification.

This invention relates to apparatus for cutting or dividing cheese or pieces of cheese to the best possible advantage without waste or breakage and with a less expenditure of time and labor than hitherto.

In carrying out my invention I advantageously employ, in combination with a counter or platform, knives and wires of different shapes and sizes adapted for different kinds and sizes of cheese or pieces of cheese to be divided, the said wires having combined with them mechanical devices for operating them. The knives are intended for dividing cheese which cannot be conveniently divided by a wire to produce a clean surface and are made of different sizes, the larger being designed for cutting whole cheeses—such as goudas, Derby goudas, or Derby shapes—into halves, and the smaller for cutting wedge-shaped pieces out of cheeses of the above-mentioned class without the necessity for dividing the same. These knives are connected to slides moving in guides and are designed, when not required for use, to be moved down below the top of the counter or platform. The larger knife is attached to the slide carrying it at both ends, while the smaller knife, which is preferably of a pointed shape, is only attached to its slide at one end. The portions of the platform adjacent to the slots through which the knives pass are made movable. Springs may be arranged in connection with the slides carrying the knives in order to assist in lifting the same. The wires are arranged to pass up through slots in the platform to form arch-shaped loops, beneath which the cheese to be cut is placed. The several wires are of different lengths to form loops of different sizes, suitable for cutting pieces of cheese of varying size, the small loop serving for cutting small pieces and the larger loops for cutting larger pieces, whereby the sharp or keen bending of the wires which would take place if a large loop were used for cutting a small piece of cheese is obviated. The sides of the slots through which the wires pass are made removable. The wires are each held at one end underneath the platform and at the other end fixed to a sliding block or piece moving in guides, each block being provided with a handle for operating it. Where great power is required, the wire can be worked by a pair of pinion-wheels, in connection with plain bandwheels, over which steel bands connected to the cutting-wire pass.

To enable my invention to be fully understood, I will describe the same by reference to the accompanying drawings, in which—

Figure 2:
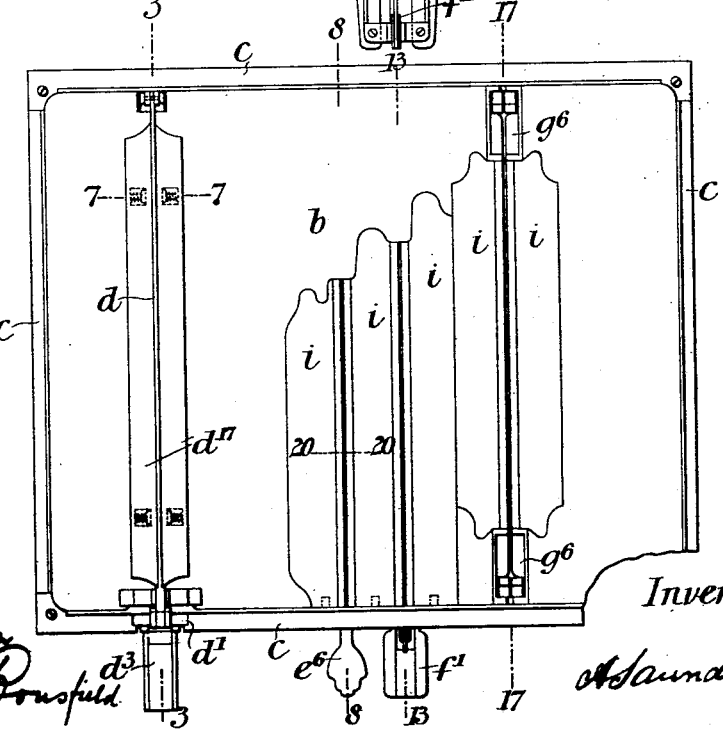
Figure 3:
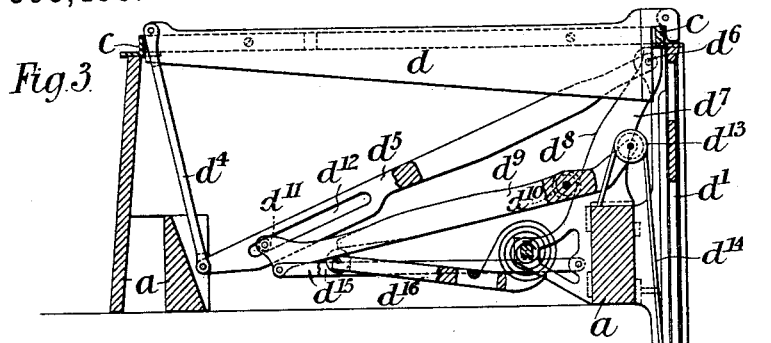
Figure 7:
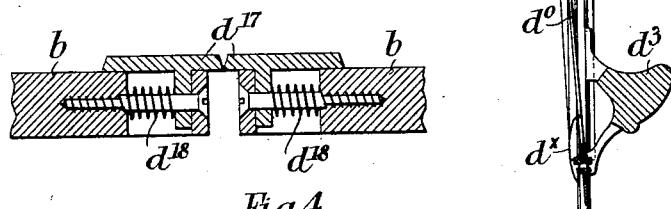
Figure 4:
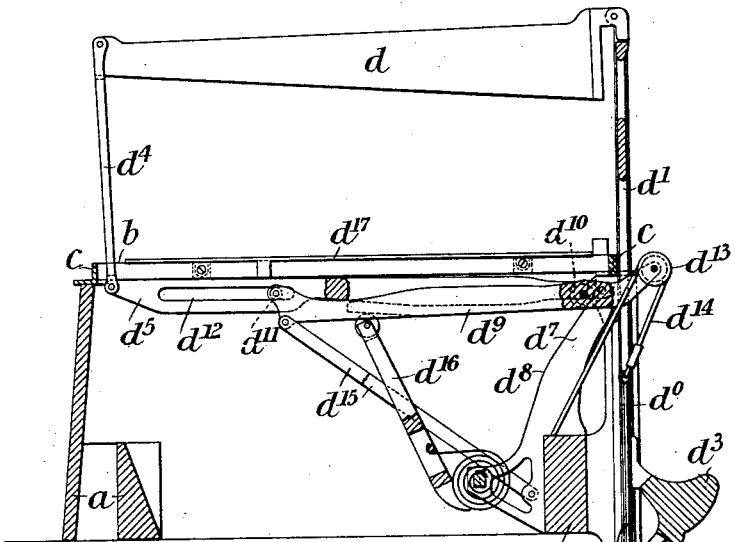
Figures 5, 6:
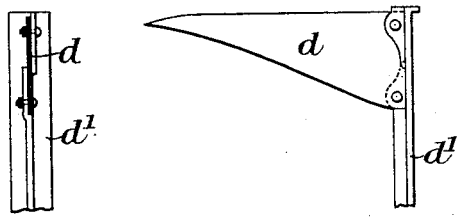
Figure 17:
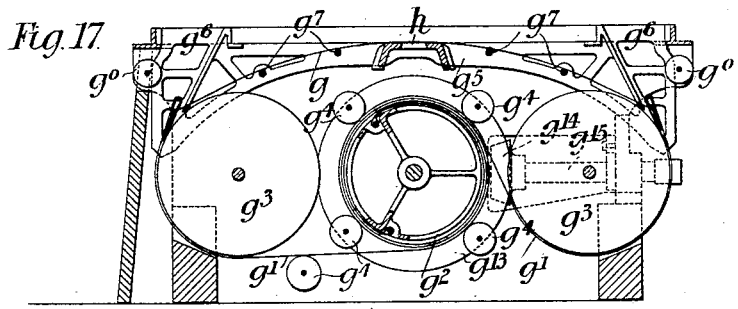
Figures 18, 19:
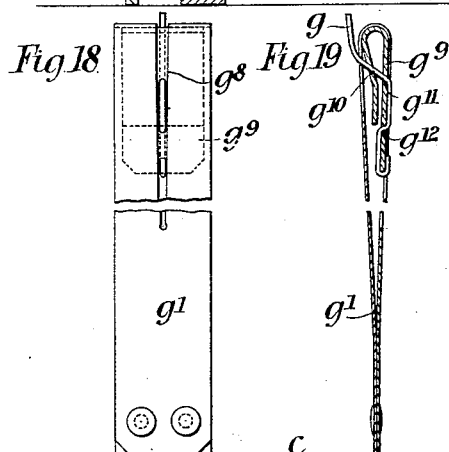
Figure 20:
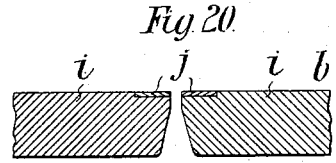
Figure 21:
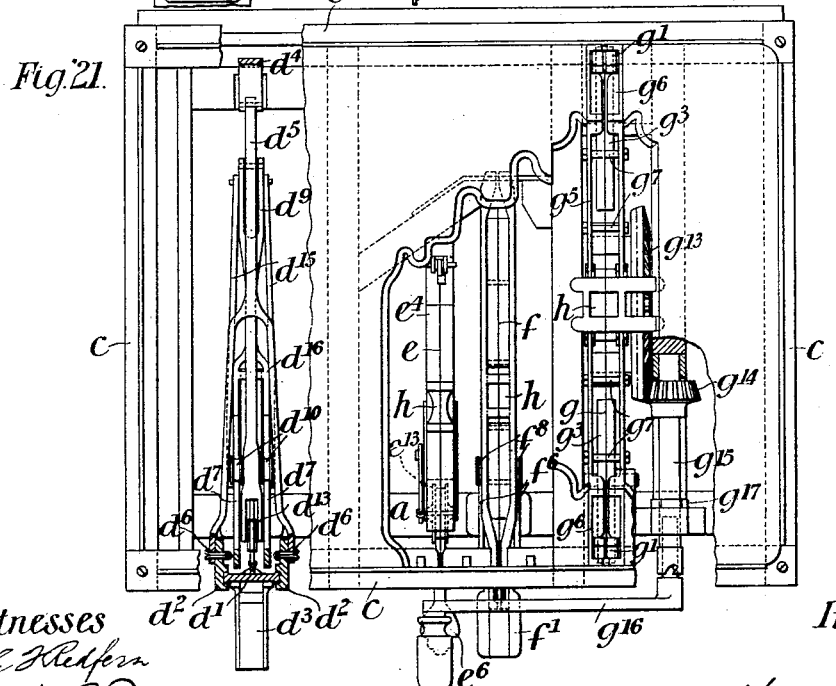

Figure 1 is a front elevation of an apparatus provided with one knife and three wires arranged according to my invention. Fig. 2 is a plan of the same. Fig. 3 is a section on the line 3 3, Fig. 2, illustrating the arrangement of a knife in accordance with my invention; and Fig. 4 is a view similar to Fig. 3, but showing the parts in a different position. Figs. 5 and 6 are a front view and a side view, respectively, of a modified form of knife; and Fig. 7 is a section on the line 7 7, Fig. 2, but drawn to a larger scale. Fig. 8 is a section on the line 8 8, Fig. 2, showing the arrangement of a cutting-wire. Figs. 9 and 10 are respectively a side view and a front view, drawn to a larger scale than Fig. 8, of a device for holding one end of the cutting-wire; and Figs. 11 and 12 are respectively a front view and a side view of the operating-handle attached to the other end of the said wire and also drawn to an enlarged scale. Fig. 13 is a section on the line 13 13, Fig. 2, showing a modified arrangement of parts for operating a cutting-wire; and Fig. 14 is a view similar to Fig. 13, showing the parts in a different position. Figs. 15 and 16 are respectively a side view and a front view illustrating a detail of the apparatus shown in Fig. 13, but drawn to a larger scale. Fig. 17 is a section on the line 17 17, Fig. 2, illustrating another modified arrangement for operating the cutting-wire; and Figs. 18 and 19 are views of details of the same drawn to a larger scale and hereinafter described. Fig. 20 is a section on the line 20 20, Fig. 2, drawn to a larger scale. Fig. 21 is a sectional plan of the whole apparatus with the exception of certain parts of the top or platform, which are removed in order to reveal the parts beneath them.

*a* is the frame of the apparatus, and *b* is the table or platform of the same, which is advantageously carried within the flanges of a metal rim $c$, secured to the sides of the frame $a$.

$d$ is the cutting-knife, and $e\ f\ g$ are the three cutting-wires.

The knife $d$ is at one end pivoted to and carried by a bar $d'$, sliding between two guides $d^2$, fixed to the frame $a$ and to the rim $c$ around the top of the same, the said bar $d'$, at the opposite end to that carrying the knife, being provided with an operating-handle $d^3$. The opposite end of the knife $d$ is connected to one end of a link-bar $d^4$, the other end of which is connected to the free end of a radius-arm $d^5$, pivoted to the frame at $d^6$.

$d^7\ d^7$ are brackets fixed on the frame $a$ and having inclines or cam-surfaces $d^8\ d^8$ upon them.

$d^9$ is a lever, at the fulcrum of which are rollers $d^{10}\ d^{10}$, designed to run upon the inclines $d^8$, the said lever $d^9$ at one end having a roller $d^{11}$, adapted to move in a slot $d^{12}$ in the radius-arm $d^5$, while the other end carries a pulley $d^{13}$, over which a cord $d^{14}$ passes, the said cord at one end being secured to the frame $a$ and at the other end to the operating slide or handle $d^3$ by the adjustable wire $d^0$.

$d^\times$ is a spring fixed at one end to the slide $d^3$ and at its free end hooking around the rod $d^0$ and serving, when the slide is lifted, to draw the said rod more or less inward to take up any slack in the cord $d^{14}$ to prevent the latter from running off the roller $d^{13}$.

$d^{15}\ d^{15}$ are radius-bars between the brackets $d^7$ and the lever $d^9$, and $d^{16}$ is a spring-arm pivoted to the brackets $d^7$ and at its free end carrying a roller which bears in a groove in the under side of the lever $d^9$, the spring in connection with the said arm $d^{16}$ being of such strength that when the handle or slide $d^3$ is raised from the position shown in Fig. 3 to that shown in Fig. 4 the lever $d^9$, and also the radius-bar $d^5$, to which one end of the knife is connected by the link $d^4$, will be lifted, the parts taking the position shown in Fig. 4. The knife being in the position shown in Fig. 4, the downward movement of the same is effected by pressing down the slide $d^3$, which is directly connected with one end of the knife. The other end of the knife is positively moved down by the pull exerted on the radius-arm $d^5$ by the lever $d^9$, which lever, it will be obvious, moves down under the pull exerted by the cord $d^{14}$, owing to the rollers $d^{10}$ moving down the inclines $d^8$ and the radius-links $d^{15}$ controlling the movement of the outer end of the said lever $d^9$.

As hereinbefore stated, for some kinds of cheese it is not necessary to use a double-ended knife. When I use a single-ended knife, I advantageously make it of the shape shown in Figs. 5 and 6, the said knife being directly attached to the bar $d'$.

$d^{17}\ d^{17}$ are movable strips at the two sides of the slot in the platform through which the knife $d$ passes, the said strips being arranged in conjunction with springs $d^{18}\ d^{18}$, which normally press the said strips toward one another, so that when the knife is out of the slot they close together, while when the knife is moved down between them they will separate. These strips $d^{17}\ d^{17}$ serve as ribs which support the cheese slightly above the main table, so that in the process of cutting the two parts of the cheese will tend to slightly open or separate in order to give freedom of movement to the knife and in order to insure clean cutting without breakage or waste.

The means which I may employ for holding and operating the cutting-wire are numerous. In the drawings I have shown the three wires $e\ f\ g$ as being arranged in conjunction with different operating and holding mechanisms; but it is to be understood that these arrangements are only given as examples.

The arrangement for holding and operating the wire $e$ is shown in Figs. 8 to 12. In these figures $e'$ is a slide to which one end of the wire $e$ is fixed, and $e^2$ is a clip or clamp to which the other end of the wire is fixed, the slide $e'$ working between guides $e^3\ e^3$, fixed to the frame $a$, and the clip $e^2$ being fixed to a cross-bar $e^4$ of the frame $a$, the top of which bar beneath the platform $b$ is arch-shaped, so that when the wire is pulled down, as indicated in the full lines in Fig. 8, it will lie upon the top of the same. The means for holding the end of the wire $e$ in the slide $e'$ will be clearly understood by reference to Fig. 12, wherein it will be noticed that the slide $e'$ has a recess $e^5$ formed in it, and the operating-handle $e^6$ of the said slide is pivoted thereto at $e^7$ and provided with a horn $e^8$, which enters the recess $e^5$ in such a manner that when the end of the wire $e$ is placed opposite to the said recess $e^5$ and the handle $e^6$ is pressed down the said wire will be forcibly clamped into the said recess between the walls of the same and the horn $e^8$. A spring-catch $e^9$, pivoted to the lower end of the slide $e'$, engages with the lower part of the handle $e^6$ and holds it securely after the wire has been clipped. The clip $e^2$ for the other end of the wire, which is shown in Figs. 9 and 10, comprises two members $e^{10}\ e^{11}$, the relative arrangement of which is such that when the end of the wire $e$ is inserted into a hole in the part $e^{11}$ and the part $e^{10}$ has the wire beneath it any strain upon the wire will tend to draw the two parts of the clip together in such a manner as to grip the wire more tightly. In order that the clip $e^2$ may follow the position of the wire during the cutting operation, so as to avoid the frequent bending of the same at the point of connection with the said clip, the latter is not rigidly attached to the bar $e^4$, but is pivoted thereto, a spring $e^{12}$ tending to move the said clip toward the wire $e$ in order to maintain the wire in an erect position when raised for cutting.

In order that the wire $e$ may normally lie beneath the platform and be raised when required for use, I provide a spring for lifting the wire and a catch for holding down the wire against the pull of the said spring. This spring is advantageously arranged in a spring-drum $e^{13}$, placed in a recess in the bar $e^4$ and having coiled outside it a steel band $e^{14}$, one end of which is attached to the slide $e'$, as shown in Fig. 12, in such a manner that when the said handle $e'$ is moved to its lowermost position the said band $e^{14}$ is unwound from the drum $e^{13}$ while the spring within the same is coiled, and that as the spring reacts the said band $e^{14}$ will be again wound onto the drum and lift the wire. $e^{15}$ is the catch which holds down the slide $e^1$ against the pull of the said spring, the said catch being engaged by a tooth $e^{16}$, Fig. 12, formed at the lower part of the slide $e'$. This catch $e^{15}$ is mounted upon a rod $e^{17}$, arranged parallel with the guides $e^3\ e^3$ and supported at its lower end in the connecting-piece between the two guides and at its upper end beneath the rim $c$ of the frame. Near its upper end this rod $e^{17}$ is provided with a finger-lever $e^{18}$, designed to rotate the rod $e^{17}$ sufficiently to disengage the catch $e^{15}$ from the tooth $e^{16}$ against the pressure of a spring $e^{19}$, coiled around the lower end of the said rod, and serving to hold the said catch $e^{15}$ in engagement with the tooth $e^{16}$. The lifting of the wire when the catch $e^{15}$ is disengaged from the slide $e'$ is further assisted by springs $e^{20}\ e^{20}$, fixed upon the top of the arched portion of the bar $e^4$, and which are compressed when the wire is pulled down on the said arch.

In order to prevent the wire $e$ from buckling or bending as it is raised by the spring, I pass it down through a series of rings $e^{21}\ e^{21}$, adapted to slide on the rod $e^{17}$ and connected to a chain, the said ring, with the chain, being lifted by and lying upon the slide as the latter rises.

The wire $f$, the arrangement for holding and operating which is illustrated in Figs. 13 to 16, differs from that hereinbefore described in that instead of being fixed at one end to the framing it is fixed to a movable lever, so as to allow of a relatively long wire being used for cutting large pieces of cheese without necessitating an unnecessarily long movement of the operating-slide. In these figures $f'$ is a slide which operates in the same manner as the slide $e'$, described in the last arrangement, the said slide $f'$ having one end of the wire $f$ attached to it. The wire, however, instead of being attached in the manner illustrated in Fig. 12, is attached by means of a clip $f^2$ of the same construction as the clip $e^2$ shown in Figs. 9 and 10, the said clip being pivoted to the slide $f'$. The other end of the wire is connected, by means of a clip $f^3$, similar to the clip $f^2$, to the free end of a lever $f^4$, pivoted at $f^5$ to brackets $f^6\ f^6$ on the frame $a$.

$f^7$ is a lever one end of which is connected to the lever $f^4$, while near the other end are rollers $f^8\ f^8$, designed to run on inclines $f^9\ f^9$ on the brackets $f^6$ in such a manner that when the free end of the lever $f^7$ is moved down the free end of the lever $f^4$, to which the wire $f$ is attached, will also be moved down, Fig. 13 showing the position of the lever when so moved and Fig. 14 the position of the lever before the movement commenced.

$f^{10}$ is a spring-arm which carries at its free end a roller acting against the under side of the lever $f^7$ and serving to lift the parts, the said spring-arm $f^{10}$ being depressed to coil its spring when the lever $f^7$ is moved down.

As the length of wire taken up by the movement of the arm $f^4$ is considerably less than that taken up by the movement of the slide $f'$, it is necessary to provide means for permitting of a certain amount of movement of the said slide $f'$ before the arm $f^4$ is moved and to arrange that movement shall be imparted to the said arm $f^4$ at such a point of the movement of the slide that by the time the latter has been moved to the bottom of its guides the arm $f^4$ is also moved to its lowest position. For this purpose I advantageously provide the following arrangement: To the bifurcated free end of the lever $f^7$ I attach two wires or bars $f^{11}$, upon which slides the axle $f^{12}$ of a sheave or pulley $f^{13}$, to a strap $f^{14}$, surrounding which is connected a rod $f^{15}$. This rod is guided in a cross-bar $f^{16}$, which connects the lower ends of the rods $f^{11}\ f^{11}$. Surrounding the rod $f^{15}$ is a spring $f^{17}$, the upper end of which spring is attached to the connecting-bar $f^{16}$, while the lower end thereof is attached to the lower end of the rod $f^{15}$, as shown in Fig. 13, so that the normal tendency of the said spring will be to lift the axle $f^{12}$, together with the sheave $f^{13}$, upon the guide-rods $f^{11}$. To the slide $f'$ is attached one end of a cord or gut string $f^{18}$, which extends over the sheave $f^{13}$, thence down and below another sheave $f^{19}$, carried at the lower ends of the guides in which the slide $f'$ works, and thence upward to the lower end of the rod $f^{15}$, to which it is united, so that the said cord and the rod $f^{15}$ are a continuation one of the other. If now the slide $f'$ is moved downward in its guides, it will be obvious that while on the one hand the wire is being pulled down at one end the pulley $f^{13}$ will also be moved downward, the spring $f^{17}$ at the same time being placed more or less in tension, so that no movement will be imparted to the lever $f^7$. When, however, a stop upon the rod $f^{15}$, which in this case is the extremity of the strap $f^{14}$, comes into contact with the connecting-bar $f^{16}$, the rods $f^{11}$ are pulled down to operate the lever $f^7$ and the lever $f^4$ to pull down the opposite end of the wire.

It will be obvious that the distance which the rod $f^{15}$ will move before movement is imparted to the lever $f^7$ must be such that the remaining part of the movement of the slide $f'$ is sufficient to move the lever $f^4$ to its lowest position, but not more than sufficient, as otherwise the downward movement of the slide $f'$ would be stopped before the wire was drawn completely through the slot in the table $b$. The slide $f'$ has arranged in conjunction with it a catch $f^{20}$, a thumb-lever $f^{21}$, and a chain with rings $f^{22} f^{22}$, which operate in the same manner as the corresponding parts described with reference to Figs. 8 and 12.

The wire $g$, which is designed for cutting whole cheeses, is arranged and operates in a manner which will be readily understood by reference to Figs. 17, 18, 19, and 21 of the drawings. The wire in this case instead of being attached to rods or levers is attached to steel bands $g' g'$, which bands are made of spring-steel the normal tendency of which is to remain straight. The said bands are adapted to be wound on a drum $g^2$, from which, owing to their tendency to occupy a straight position, they will constantly tend to unwind themselves, whereby when a suitable catch in connection with the said drum $g^2$ is released the bands will automatically uncoil from the drum to raise the wire ready for use. $g^3 g^3$ are rollers around which the said bands pass from above the platform to the drum, and $g^4 g^4$ are small rollers which prevent the reaction of the bands after coiling from taking place without rotating the wheel $g^2$—that is to say, the said rollers $g^4 g^4$ serve for preventing the spring-bands from uncoiling in an improper direction.

$g^5$ is a metal bridge-piece arranged beneath the platforms and having at its ends openings $g^6 g^6$, through which the bands $g'$ pass, in which openings rollers $g^0$ are placed to guide the bands in their upward movement. The said bridge-piece is also provided, as shown, with a series of pins $g^7 g^7$, upon which the wire $g$ will lie when the bands $g' g'$ are coiled up, as will be clearly understood by reference to Fig. 17 of the drawings. The wire $g$ may be connected to the ends of the bands in any suitable manner. In the drawings, Figs. 18 and 19 illustrate a very suitable method of connection. In these figures, which are respectively face and edge views of one end of one band drawn to a larger scale than Fig. 17, it will be noticed that the end of the band is bent over and riveted to form a loop, which is provided with a longitudinal slot $g^8$. Into this loop is placed a folded piece of metal $g^9$, having holes at $g^{10}$, $g^{11}$, and $g^{12}$, and this folded piece of metal, having the wire passed through the said holes, is placed in the loop of the band by passing it through the slot $g^8$ to one side of the loop, it being then returned into proper position within the loop.

$g^{13}$ is a bevel-wheel fixed to or formed integral with the drum $g^2$, and $g^{14}$ is a pinion engaging with the wheel $g^{13}$ and adapted to be operated through the medium of a shaft $g^{15}$ by a handle $g^{16}$ on the outer end thereof, this gearing serving for winding down the band with considerable power in order to cut a cheese. $g^{17}$ is a ratchet-wheel fixed on the shaft $g^{15}$ and having in engagement with it a pawl $g^{18}$, (clearly shown in Fig. 1,) which can be released by the pressure of the finger in order to allow the reaction of the bands to cause their uncoiling and the consequent moving up of the wire $g$ ready for use.

In all the foregoing arrangements it will be noticed that the bridge-piece $g^5$, upon which the wire $g$ lies when pulled down, is provided at the center with a hole or recess, as shown at $h$ in Figs. 8, 13, 14, 17, and 21. These hollows or recesses are for the purpose of preventing small pieces of cheese which may be drawn through the slots from accumulating adjacent to the wire.

In order to afford ready access to the wires, the portions of the table adjacent to the sides of the slots are made removable, as will be understood by reference to Fig. 2, in which $i\ i$ indicate the movable pieces. These movable pieces are at their edges preferably faced with metal, as indicated at $j\ j$, Fig. 20.

Although I have shown and described an apparatus having one knife and three wires, it is to be understood that I may construct an apparatus having any other number of knives or wires, or having one or more knives or one or more wires only, according to the requirements of retailers and others.

Having now particularly described and ascertained the nature of my said invention and in what manner the same is to be performed, I declare that what I claim is—

1. The combination with the table provided with a slot, and a laterally-movable spring-actuated plate adapted normally to overlie said slot, of a vertically-movable cutter adapted to pass through said slot and means for operating said cutter, substantially as described.

2. The combination with the table provided with a slot, a pair of laterally-movable plates having meeting portions normally overlying said slot, and springs for holding said plates in engagement with each other, of a vertically-movable cutter and operating means therefor, substantially as described.

3. The combination with the table provided with a slot, of a vertically-movable slide, a cutting device having one end secured to said slide, and adapted to pass through said slot to a position beneath the table, and a spring for elevating said cutting device above the table, substantially as described.

4. The combination with the table provided with a slot, of the vertically-movable slide, a cutter secured to the upper end of said slide and adapted to pass through said slot and to lie beneath the table, a catch for holding the cutter beneath the table and a spring for elevating the cutter above the table, substantially as described.

5. The combination with the table, of the vertically-movable slide, the cutter having one end secured to said slide, a pivoted arm having its movable end secured to the other end of the cutter and connections between said slide and said pivoted arm, for positively operating both ends of the cutter, substantially as described.

6. The combination with the table, of a vertically-movable slide, a cutter having one end secured to said slide, a pivoted arm having its movable end connected to the other end of said cutter, an operating-lever having one end connected to said pivoted arm and provided at its other end with friction-rolls, a stationary cam-grade engaging said rollers and a connection between said operating-lever and said slide, substantially as described.

7. The combination with the table, of a vertically-movable slide, a cutter having one end secured to said slide, a pivoted arm having its movable end connected to the other end of said cutter, said arm being provided with a slotted portion, an operating-lever provided with friction-rolls at one end and having a projection at its other end engaging the slot in said pivoted arm, a stationary cam-grade engaging said operating-lever, a radius-arm pivoted at one end to a stationary part and at the other end to said operating-lever, for forcing the projection thereof to travel in the slot, in said pivoted arm, and a connection between said operating-lever and said slide, substantially as described.

8. The combination with the table provided with a slot, of a vertically-movable slide, a cutter adapted to pass through said slot and to lie beneath the table having one end secured to said slide, a pivoted arm having its movable end connected with the other end of said knife, an operating-lever provided at one end with friction-rollers and having its other end connected with said pivoted arm, a stationary cam-grade for operating said lever, a spring lifting-arm engaging said lever, connections between said lever and the slide, and a catch for holding said parts in position with the cutter below the table, substantially as described.

9. The combination with the table provided with a slot, of a vertically-movable slide, a cutting-wire having one end secured to said slide, and adapted to pass through the slot and below said table, a support for the wire below the table, spring lifting-arms on said support for lifting the wire through said slot, substantially as described.

10. The combination with the table provided with a slot, of a vertically-movable slide, a cutting-wire having one end secured to said slide, a support for the wire below said slot, spring lifting-arms for lifting the wire through the slot, and a catch for holding said slide in its lowest position with the wire beneath the table, substantially as described.

11. The combination with the table, of the vertically-movable slide, a cutting-wire having one end connected to said slide, a pivoted arm having its movable end connected to the other end of said wire, and operative connections between said pivoted arm and said slide, permitting lost motion whereby the slide can be moved a definite distance before operating said pivoted arm, substantially as described.

ALFRED SAUNDERS.

Witnesses:
 G. F. REDFERN,
 JOHN E. BOUSFIELD.